(No Model.) 2 Sheets—Sheet 1.

C. ZOLLER & F. SCHIMPER.
KRAEUSE MEASURING APPARATUS.

No. 371,724. Patented Oct. 18, 1887.

WITNESSES:
A. Schehl.
Carl Kay

INVENTORS
Charles Zoller
and Fred. Schimper
BY Goepel & Raegener
ATTORNEYS.

(No Model.) 2 Sheets—Sheet 2.

C. ZOLLER & F. SCHIMPER.
KRAEUSE MEASURING APPARATUS.

No. 371,724. Patented Oct. 18, 1887.

WITNESSES:
A. Schehl.
Carl Karp

INVENTORS
Charles Zoller
and Frederick Schimper
BY
Goepel & Raegener
ATTORNEYS.

UNITED STATES PATENT OFFICE.

CHARLES ZOLLER, OF NEW YORK, N. Y., AND FREDERICK SCHIMPER, OF UNION, NEW JERSEY.

KRAEUSE-MEASURING APPARATUS.

SPECIFICATION forming part of Letters Patent No. 371,724, dated October 18, 1887.

Application filed June 30, 1887. Serial No. 242,961. (No model.)

*To all whom it may concern:*

Be it known that we, CHARLES ZOLLER, of the city, county, and State of New York, and FREDERICK SCHIMPER, of the town of Union, county of Hudson, and State of New Jersey, have invented certain new and useful Improvements in Kraeuse-Measuring Apparatus, of which the following is a specification.

This invention relates to an improved portable apparatus to be used by brewers for measuring the exact quantity of "kraeuse-beer" required for each shavings-cask.

Heretofore the quantity of kraeuse supplied to the shavings-casks was determined either by drawing the kraeuse off into a tub of a certain size and then pumping the contents of the tub into the cask, or a circulating-pump was employed and the number of strokes counted, whereby approximately the required quantity of kraeuse was supplied to the shavings-cask. These methods were only approximately correct and did not furnish a uniform quantity to each cask.

The object of this invention is to supply an accurately-determined quantity of kraeuse-beer to each shavings-cask by means of a special apparatus, which consists of a meter of any approved construction that is connected to the fermenting-vat by a supply-pipe, and provided with a valve at the induction-opening of the meter, the eduction-opening of the meter being connected by a discharge-pipe with the shavings-cask. The quantity of kraeuse passing through the meter is registered by a registering device operated by the spindle of the rotary wheel of the meter, said registering device being provided with three dials and hands, two for indicating the number of barrels of kraeuse-beer supplied to the shavings-cask and a third dial for indicating the total quantity of kraeuse that has passed through the apparatus.

Figure 1:
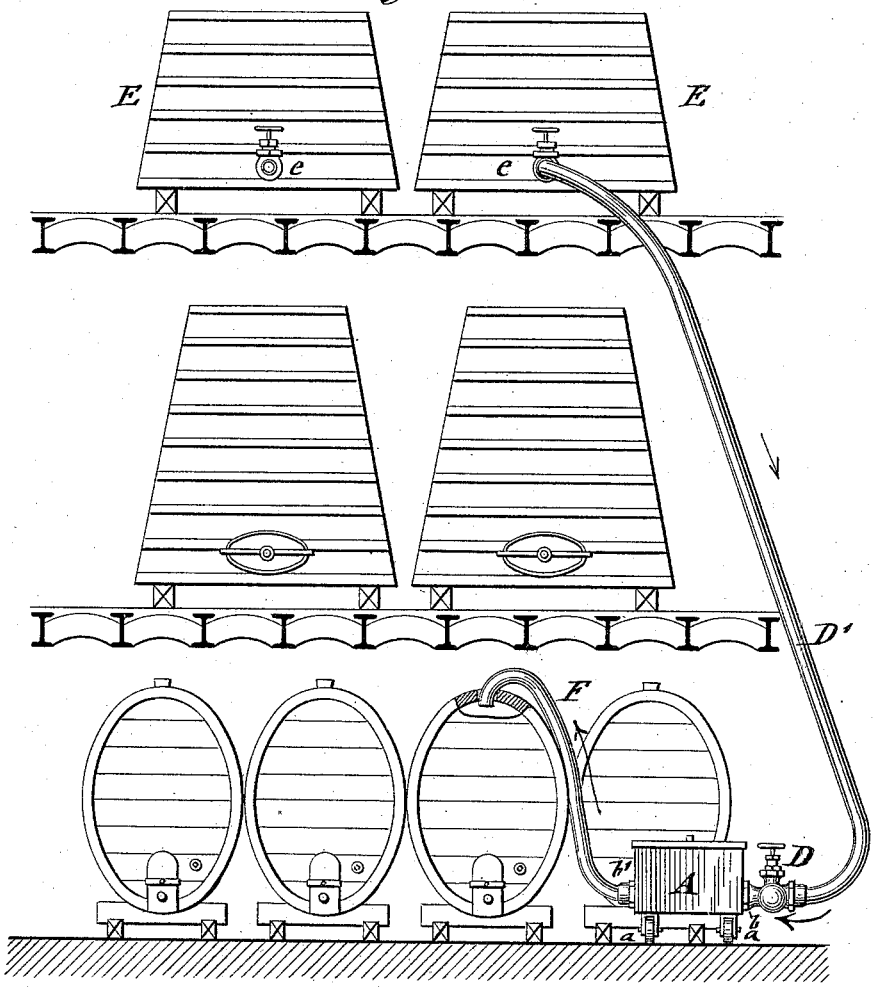
Figure 2:
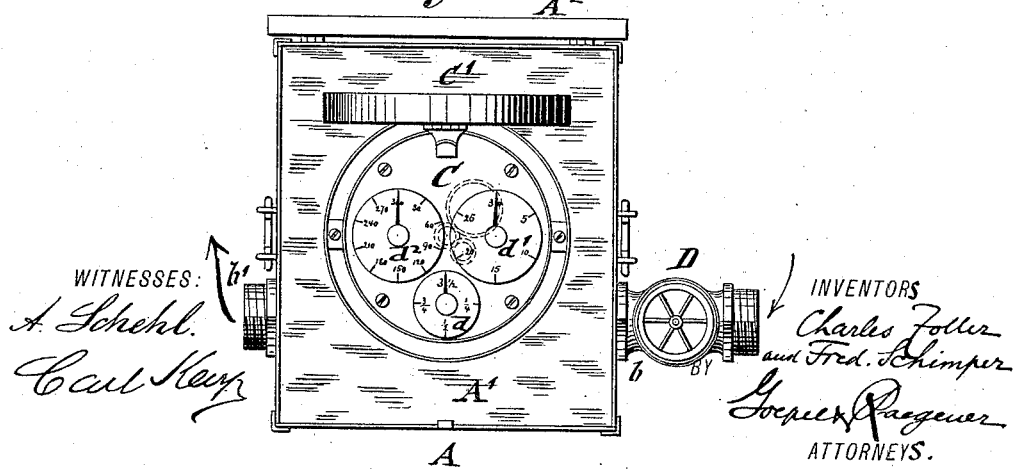
Figure 3:
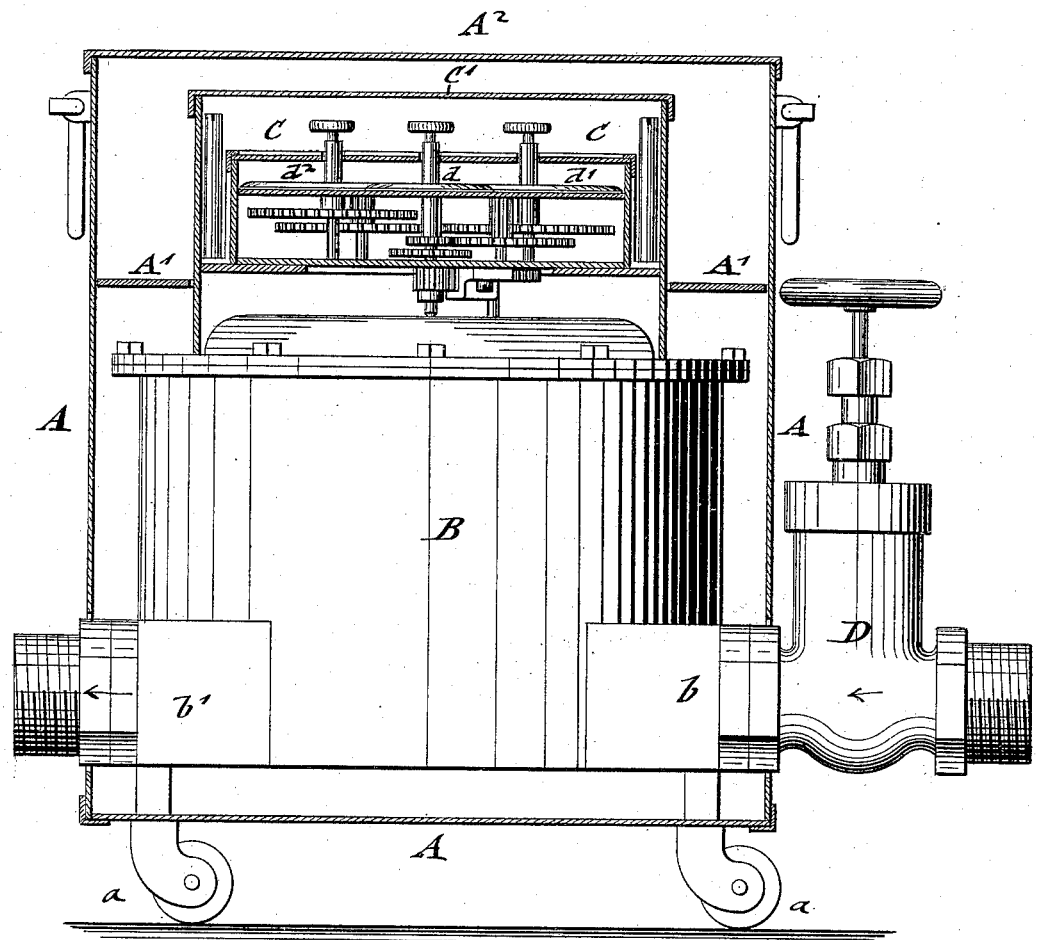

In the accompanying drawings, Figure 1 represents a vertical section through different floors of the brewery, showing the fermenting-vats, storage-vats, and shavings-casks, and our improved apparatus for measuring kraeuse-beer and its connection, respectively, with a fermenting-vat and one of the shavings-casks. Fig. 2 is a top view of the measuring apparatus shown with the lid open; and Fig. 3 is a vertical section through the measuring apparatus, drawn on a larger scale.

Similar letters of reference indicate corresponding parts.

Our improved kraeuse-measuring apparatus consists of three main parts — a casing, A, that is placed on casters $a$, a meter, B, of any approved construction at the lower part of the casing A, and a registering device, C, that is connected by suitable transmitting-gearing with the rotary transmitting-spindle of the meter. The casing A is provided above the meter with a horizontal partition, A', above which the registering device C and its inclosing-box is arranged. The registering device is closed by a hinged lid, C', while the casing is closed by a hinged lid, A$^2$, both of which are closed when the apparatus is not in use. The meter B is provided at the induction-opening $b$ with a valve, D, said valve being coupled to a supply-pipe, D', the opposite end of which is connected to the discharge-faucet $e$ of the fermenting-vat E, as shown in Fig. 1. The eduction-opening $b'$ of meter B is connected by a rubber or other pipe, F, with the bung-hole of one of the shavings-casks to be supplied with kraeuse-beer, as shown in Fig. 1.

The registering device C of the measuring apparatus is provided with three dials and three hands, the first dial and hand, $d$, indicating quantities up to one barrel and fractions of a barrel, the second dial and hand, $d'$, multiples of barrels, say up to thirty, while the third dial and hand, $d^2$, indicate a still larger number of barrels, say up to three hundred. The hands of the different dials are operated by a number of properly-proportioned transmitting gear-wheels, so that they move at a correspondingly-proportioned speed, so that, for instance, when the hand of the first dial has made five revolutions, the hand of the second dial moves to the number 5 on the second dial, while when the hand of the second dial has completed one revolution the hand of the third dial moves to figure 30 on the third dial, and so on. The usual quantity of kraeuse supplied to a shavings-cask is, for fifty barrels of ruh-beer, from six to eight barrels of kraeuse-beer, according to the condition and quality of the beer.

For supplying kraeuse by the apparatus the attendant first sets all the hands of the dials to zero, then opens the supply-valve D, and watches the registering device closely until the required quantity is indicated on the first and second dials. At the moment when the hands indicate that the determined quantity of kraeuse has passed through the meter the supply-valve D is shut off. The discharge-pipe F is then connected to the next shavings-cask the valve of the supply-pipe opened, and the same quantity of kraeuse-beer supplied to this cask, the valve being shut off as soon as the hands indicate that the required quantity has passed through the meter. In this manner all the shavings-casks are charged with kraeuse. The total quantity of kraeuse supplied to the different casks is indicated by the hand on the third dial. When the contents of the fermenting-vat E are drawn off, the supply-pipe D' is connected to the next fermenting-vat and the charging of the shavings-casks continued in the same manner.

Before charging each shavings-cask the hands of the first and second dials have to be returned to zero, which is accomplished by means of buttons applied to the hollow arbors of said hands. The hand of the third dial, however, is not returned to zero, but allowed to move on, so as to indicate the total quantity of kraeuse that is charged into the shavings-casks. In this manner the brewer is enabled not only to supply an accurately-determined quantity of kraeuse to each individual shavings-cask, but also has an exact control of the total quantity of kraeuse that is supplied from the fermenting-vats to the shavings-casks.

The measuring apparatus can also be used for accurately determining the contents of casks or vats used in breweries or other establishments. For this purpose a vat of sufficient size is filled with water, the supply-pipe connected with this vat, and the apparatus connected by the discharge-pipe with the cask or vat to be measured. All the hands are turned to zero and the supply-valve then opened. As soon as the cask or vat is entirely filled with water the valve is shut off and the quantity of water that has passed through the meter read off on the dials, the dials indicating the number of barrels of the United States standard of thirty-one and one-half gallons each. In this manner the apparatus can serve for two purposes—first, for supplying the exact quantity of kraeuse-beer to be charged into each shavings-cask, and, secondly, for determining accurately the contents of any or all the casks or vats of a brewery or other establishment.

Having thus described our invention, we claim as new and desire to secure by Letters Patent—

1. A measuring apparatus for breweries and other establishments, consisting of a wheeled casing, a meter in said casing, a registering device operated by said meter, a supply-pipe connecting the meter with the supply-vat, a supply-valve at the induction-opening of the meter, and a discharge-pipe connecting the eduction-opening of the meter with the cask or vat to be supplied, substantially as set forth.

2. An apparatus for measuring kraeuse-beer, composed of a wheeled exterior casing, a meter in said casing, a supply-valve at the induction-opening of said meter, and a registering device operated by said meter, said registering device being provided with three dials and hands for indicating, respectively, the unit of measurement, the multiples thereof, and the total quantity of liquid passed through the measuring apparatus during the different operations of the same, substantially as set forth.

In testimony that we claim the foregoing as our invention we have signed our names in presence of two subscribing witnesses.

CHARLES ZOLLER.
    FR. SCHIMPER.

Witnesses:
 JOHN G. DISTLER,
 DANIEL BERMES, Jr.